(12) United States Patent (10) Patent No.: US 12,617,200 B2
Usami                                           (45) Date of Patent:       May 5, 2026

(54) PRINTING APPARATUS, PRINTING METHOD, AND COMPUTER-READABLE STORAGE MEDIUM

(71) Applicant: BROTHER KOGYO KABUSHIKI KAISHA, Nagoya (JP)

(72) Inventor: Hajime Usami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 108 days.

(21) Appl. No.: 18/768,479

(22) Filed: Jul. 10, 2024

(65) Prior Publication Data

US 2025/0058561 A1      Feb. 20, 2025

(30) Foreign Application Priority Data

Aug. 17, 2023    (JP) .................................. 2023-133016

(51) Int. Cl.
*B41J 2/045*          (2006.01)
*G06F 13/42*         (2006.01)
*G06K 15/10*         (2006.01)

(52) U.S. Cl.
CPC ....... *B41J 2/04508* (2013.01); *B41J 2/04541* (2013.01); *G06F 13/4247* (2013.01); *G06K 15/102* (2013.01)

(58) Field of Classification Search
CPC ............... B41J 2/04508; B41J 2/04541; G06F 13/4247; G06K 15/102
See application file for complete search history.

(56) References Cited

U.S. PATENT DOCUMENTS

| | | | | |
|---|---|---|---|---|
| 9,245,210 | B2 * | 1/2016 | Ono ..................... | B41J 2/04586 |
| 2006/0274112 | A1 * | 12/2006 | Jackson Pulver ...... | B41J 2/2139 |
| | | | | 347/42 |
| 2012/0069072 | A1 * | 3/2012 | Nakata .................... | G06F 3/126 |
| | | | | 347/11 |
| 2018/0079202 | A1 * | 3/2018 | Nakamura ............. | B41J 2/0458 |

FOREIGN PATENT DOCUMENTS

JP          2010-146253  A        7/2010

* cited by examiner

*Primary Examiner* — Henok D Legesse
(74) *Attorney, Agent, or Firm* — Merchant & Gould P.C.

(57)                    ABSTRACT

A printing apparatus includes a main controlling circuit, a subsidiary controlling circuit group, and heads. The subsidiary controlling circuit group includes a plurality of subsidiary controlling circuits, including a first subsidiary controlling circuit and a second subsidiary controlling circuit connected with one another serially, and is configured to transmit print data received from the main controlling circuit from upstream to downstream. The first subsidiary controlling circuit is configured to, based on a volume of outgoing data to be transmitted to one of the heads and a volume of incoming data from the second subsidiary controlling circuit, determine whether a first data-transfer request is to be transmitted to the second subsidiary controlling circuit, and based on a determination that the first data-transfer request is to be transmitted, transmit the first data-transfer request to the second subsidiary controlling circuit.

13 Claims, 9 Drawing Sheets

PRINTING APPARATUS, PRINTING METHOD, AND COMPUTER-READABLE STORAGE MEDIUM

REFERENCE TO RELATED APPLICATIONS

This application claims priority from Japanese Patent Application No. 2023-133016, filed on Aug. 17, 2023. The entire content of the priority application is incorporated herein by reference.

BACKGROUND ART

An image forming system including a personal computer (PC) for generating image data, a receiver board unit, and a plurality of distributor board units, is known. The receiver board unit and the distributor board units may be connected serially from the PC. To each of the distributor board units, a plurality of head controllers may be connected. From the distributor board units, the receiver board unit may receive busy signals each indicating whether the distributor board unit is capable of receiving image data (print data). The receiver board unit receiving the busy signal may transmit the print data to the distributor board unit that issued the busy signal, and the distributor board unit receiving the print data from the receiver board may provide the print data to a specific one of the head controllers.

SUMMARY

According to the known image forming system, the receiver board unit may not transmit the print data to the head controller until the busy signal indicating the receivable capacity is received from the distributor board unit.

The present disclosure relates to a printing apparatus, a printing method, and a computer-readable storage medium, by which data may be transmitted more efficiently.

According to an aspect of the present disclosure, a printing apparatus includes a main controlling circuit, a subsidiary controlling circuit group, and a plurality of heads. The subsidiary controlling circuit group includes a plurality of subsidiary controlling circuits connected with one another serially. The subsidiary controlling circuit group is configured to transmit print data received from the main controlling circuit from upstream to downstream through the plurality of subsidiary controlling circuits. The plurality of subsidiary controlling circuits includes a first subsidiary controlling circuit and a second subsidiary controlling circuit on an upstream side of the first subsidiary controlling circuit. The first subsidiary controlling circuits is configured to, based on a volume of outgoing data to be transmitted from the first subsidiary controlling circuit to one of the plurality of heads and a volume of incoming data from the second subsidiary controlling circuit to be received by the first subsidiary controlling circuit, determine whether a first data-transfer request is to be transmitted from the first subsidiary controlling circuit to the second subsidiary controlling circuit, the first data-transfer request being a request for the print data to be transferred from upstream to the first subsidiary controlling circuit; and based on a determination that the first data-transfer request is to be transmitted, transmit the first data-transfer request to the second subsidiary controlling circuit.

According to an aspect of the present disclosure, a method is implementable in a printing apparatus including a main controlling circuit, a subsidiary controlling circuit group, and a plurality of heads. The subsidiary controlling circuit group includes a plurality of subsidiary controlling circuits connected with one another serially, and the subsidiary controlling circuit group is configured to transmit print data received from the main controlling circuit from upstream to downstream through the plurality of subsidiary controlling circuits. The plurality of subsidiary controlling circuits includes a first subsidiary controlling circuit and a second subsidiary controlling circuit on an upstream side of the first subsidiary controlling circuit. The method includes, based on a volume of outgoing data to be transmitted from the first subsidiary controlling circuit to one of the plurality of heads and a volume of incoming data from the second subsidiary controlling circuit to be received by the subsidiary controlling circuit, determining whether a first data-transfer request is to be transmitted from the first subsidiary controlling circuit to the second subsidiary controlling circuit, the first data-transfer request being a request for the print data to be transferred from upstream to the first subsidiary controlling circuit; and based on a determination that the first data-transfer request is to be transmitted, transmitting the first data-transfer request from the first subsidiary controlling circuit to the second subsidiary controlling circuit.

According to an aspect of the present disclosure, a non-transitory computer readable storage medium stores computer readable instructions that are executable by a computer in a printing apparatus. The printing apparatus includes a main controlling circuit, a subsidiary controlling circuit group, and a plurality of heads. The subsidiary controlling circuit group includes a plurality of subsidiary controlling circuits connected with one another serially, and the subsidiary controlling circuit group is configured to transmit print data received from the main controlling circuit from upstream to downstream through the plurality of subsidiary controlling circuits. The plurality of subsidiary controlling circuits includes a first subsidiary controlling circuit and a second subsidiary controlling circuit on an upstream side of the first subsidiary controlling circuit. The computer readable instructions, when executed by the computer, cause the computer to, based on a volume of outgoing data to be transmitted from the first subsidiary controlling circuit to one of the plurality of heads and a volume of incoming data from the second subsidiary controlling circuit to be received by the first subsidiary controlling circuit, determine whether a first data-transfer request is to be transmitted from the first subsidiary controlling circuit to the second subsidiary controlling circuit, the first data-transfer request being a request for the print data to be transferred from upstream to the first subsidiary controlling circuit; and based on a determination that the first data-transfer request is to be transmitted, transmit the first data-transfer request from the subsidiary controlling circuit to the second subsidiary controlling circuit.

DESCRIPTION

First Embodiment

Figure 1:
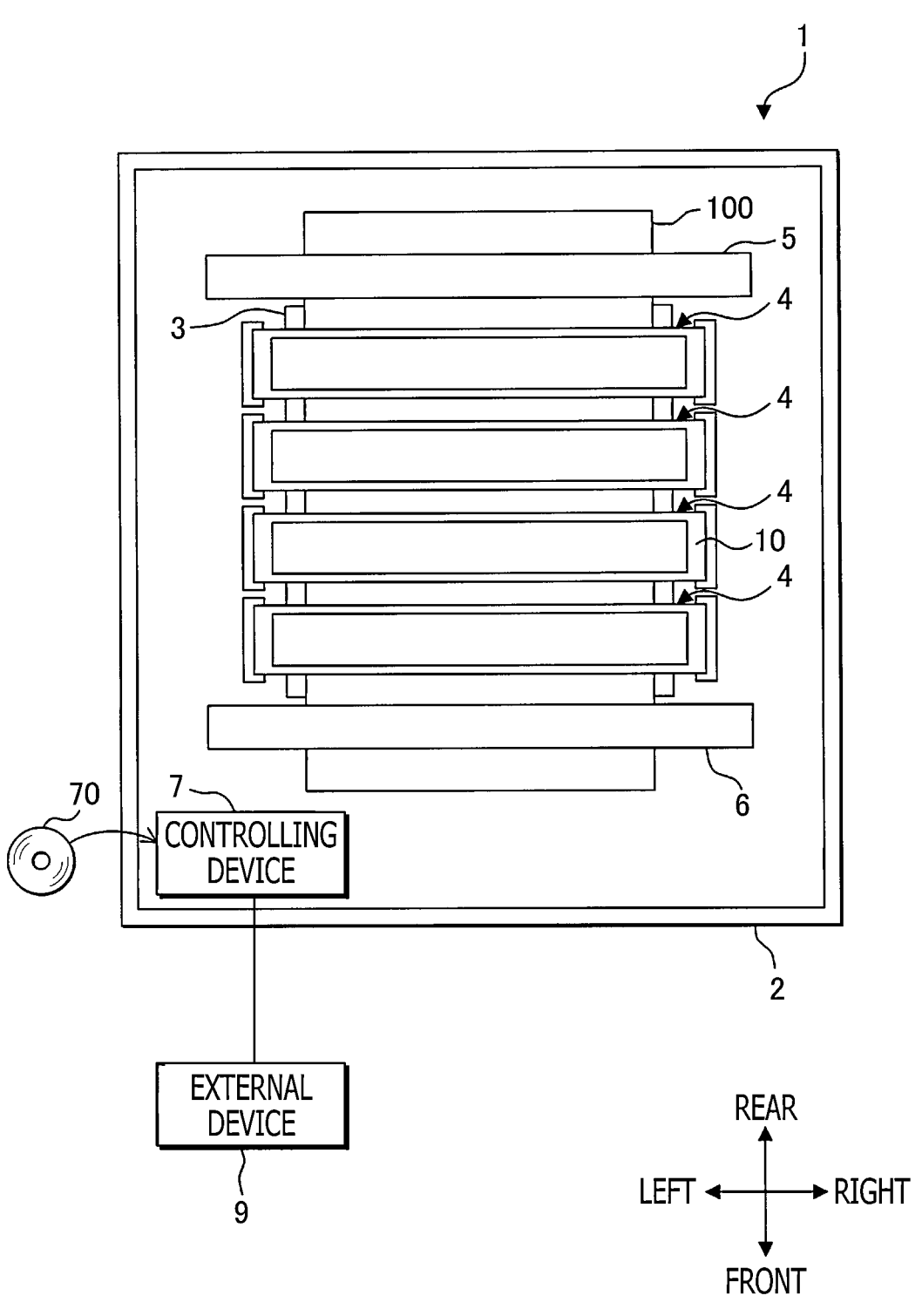
FIG. 1 is a schematic plan view of a printing apparatus.

A first embodiment of the present disclosure will be described below with reference to FIGS. 1-5. FIG. 1 is a schematic plan view of a printing apparatus 1. In FIG. 1, a conveying direction to convey a printing sheet 100 corresponds to a front-rear direction in the printing apparatus 1. The printing sheet 100 may not necessarily be limited to a sheet of paper but may optionally be a piece of film or fabric. Directions in the printing apparatus 1 correspond to orientations indicated as right, left, front, and rear by bidirectionally pointing arrows shown in FIG. 1. A front-to-rear or rear-to-front direction may be called the front-rear direction, an up-to-down or down-to-up direction may be called a vertical direction, and a left-to-right or right-to-left direction may be called a widthwise direction.

As shown in FIG. 1, the printing apparatus 1 includes a platen 3, four inkjet heads 4, two conveyer rollers 5, 6, and a controlling device 7, which are accommodated in a case 2. The printing sheet 100 may be conveyed on an upper surface of the platen 3. The inkjet heads 4 are aligned along the conveying direction above the platen 3. The inkjet heads 13 are so-called line-styled inkjet heads. The inkjet heads 13 are each supplied with ink in different colors from ink tanks, which are not shown.

As shown in FIG. 1, the conveyer rollers 5, 6 are located rearward and frontward, respectively, with respect to the platen 3. The conveyer rollers 5, 6 may be driven by a motor, which is not shown, to convey the printing sheet 100 frontward over the platen 3. The controlling device 7 is connected for communication with an external device 9 such as a PC to exchange data. The controlling device 7 may control devices in the printing apparatus 1 based on print data transmitted from, for example, the external device 9.

Figure 2:
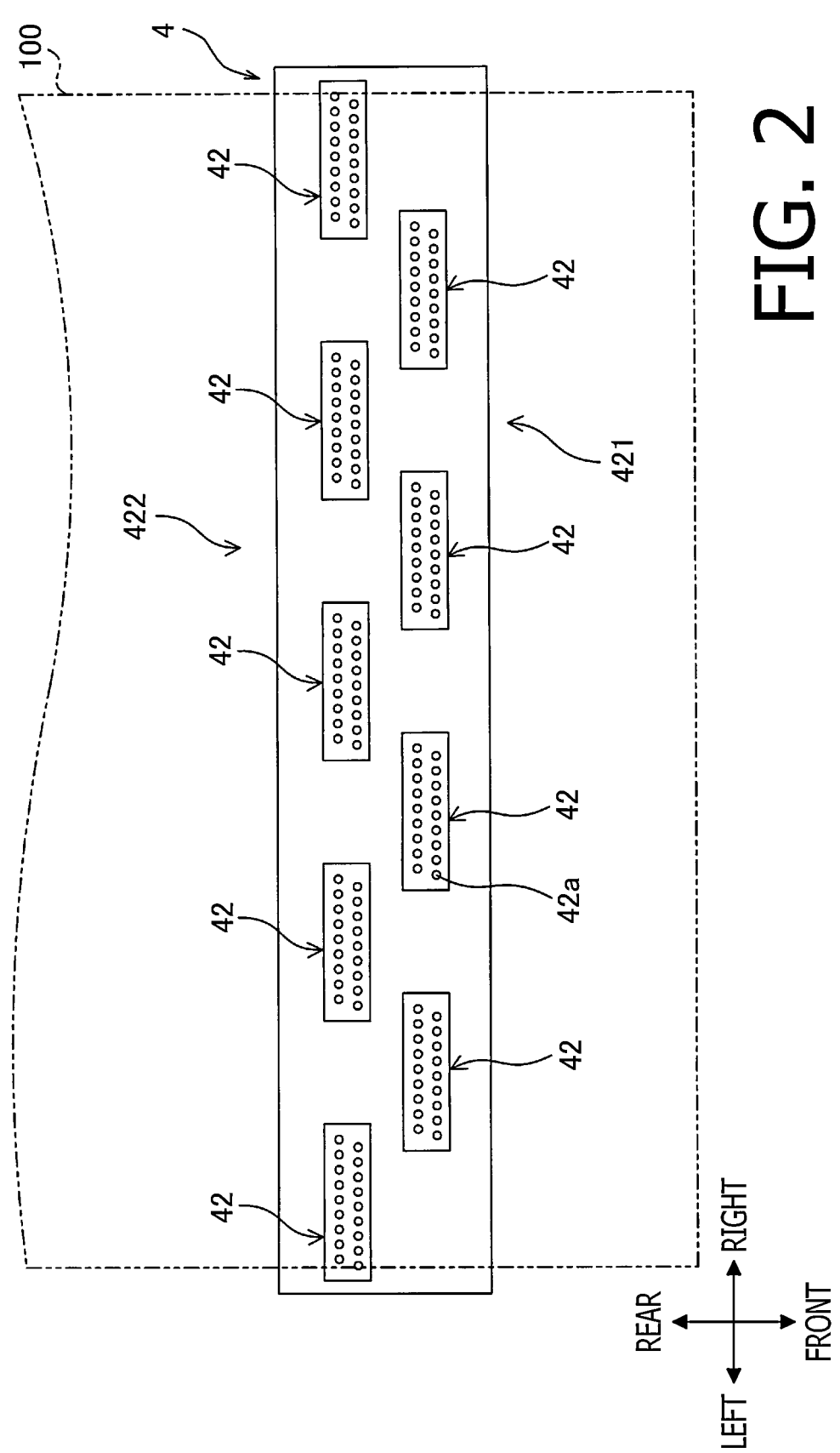
FIG. 2 is a plan view of an inkjet head.

FIG. 2 is a plan view of one of the inkjet heads 4. Each inkjet head 4 includes a group 420 of heads 42. On a lower surface of each head 42, a plurality of nozzles 42*a* are formed. The group 420 of heads 42 include a first head row 421 including four heads 42 aligning along the widthwise direction and a second head row 422 including five heads 42 aligning along the widthwise direction. The first head row 421 is located frontward, and the second head row 422 is located rearward. The heads 42 in the first head row 421 and the second head row 422 are arrayed in a staggered arrangement such that each of the heads 42 in the first head row 421 is located between two of the five heads 42 in the second head row 422. The inkjet heads 4 include a driving device (not shown) and may be moved by the driving device to a position of a flushing receiver (not shown).

Figure 3:
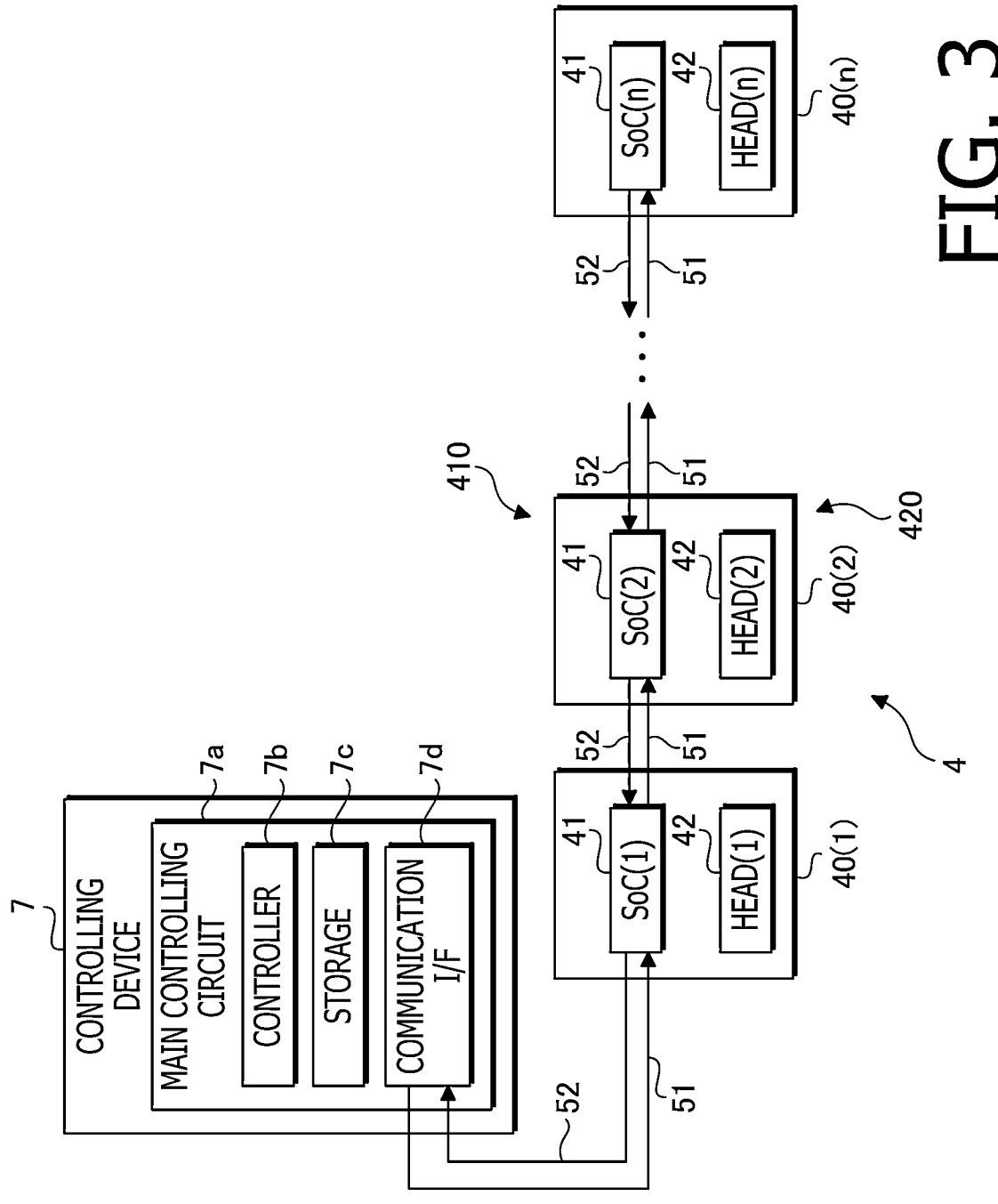
FIG. 3 is a block diagram to illustrate a controlling device and the inkjet head.

FIG. 3 is a block diagram to illustrate the controlling device 7 and the inkjet head 4. The controlling device 7 includes a main controlling circuit 7*a*. The main controlling circuit 7*a* includes a controller 7*b*, a storage 7*c*, and a communication interface (I/F) 7*d*. The controller 7*b* includes a logic circuit such as FPGA. Optionally, the controller 7*b* may include a processor such as CPU or ASIC. The storage 7*c* includes a main storage and an auxiliary storage. The main storage may be, for example, RAM. The auxiliary storage may include, for example, ROM and a rewritable memory such as, for example, EEPROM, Flash ROM, and hard disk drive. The auxiliary storage may store controlling programs. The controller 7*b* may read and execute the controlling programs stored in the auxiliary storage. The controlling programs may be imported from a recordable medium 70 (see FIG. 1), such as optical disk and removable flash memory, and installed in the auxiliary storage. Optionally, the controlling programs may be downloaded from a server (not shown), which is connected to the printing apparatus 1 through a communication network. The communication I/F 7*d* is connected with a forward-communication path 51 and a backward-communication path 52. The controlling device 7 may control the printing apparatus 1 based on the controlling programs.

The inkjet head 4 includes a group 410 of head modules 40. The plurality of head modules 40 in the group 410 are aligned in line, for example, in the widthwise direction, and are connected with one another serially through the forward-communication path 51 and serially through the backward-communication path 52. The plurality of head modules 40 includes, for example, a first head module 40 (1), a second head module 40 (2), a third head module 40 (3) . . . , and an n-th head module (n), whereas n represents a natural number. The first head module 40 (1) is located most leftward, and the n-th head module (n) is located most rightward. The first head module 40 (1) is located closest to the controlling device 7 among the entire head modules 40, and the n-th head module 40(*n*) is located farthest from the controlling device 7 among the entire head modules 40.

Figure 4:
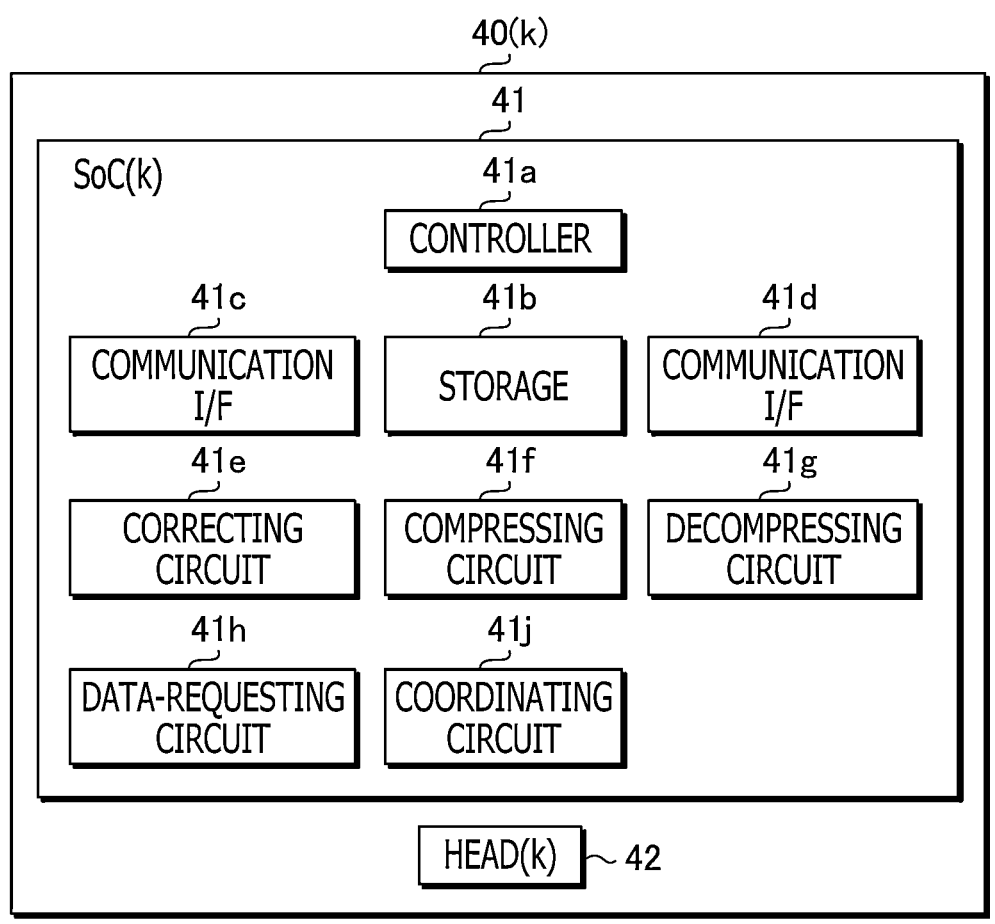
FIG. 4 is a block diagram to illustrate a k-th head module.

FIG. 4 is a block diagram to illustrate a k-th head module (k) whereas k represents a natural number smaller than or equal to n. The k-th head module 40(*k*) includes an SoC 41 and the head 42. In the following description, the SoC 41 and the head 42 in the k-th head module 40(*k*) may be called SoC(k) and head (k), respectively. The SoC(k) is an example of the subsidiary controlling circuit. The SoC(k) includes a controller 41*a*, a storage 41*b*, a communication I/F 41*c*, a communication I/F 41*d*, a correcting circuit 41*e*, a compressing circuit 41*f*, a decompressing circuit 41*g*, a data-requesting circuit 41*h*, and a coordinating circuit 41*j*. The controller 41*a* includes, for example, a logic circuit and a processor. The storage 41*b* includes a volatile memory such as SDRAM and rewritable memory such as, for example, EEPROM, Flash ROM, and hard disk drive. The storage 41*b* may store non-discharging information indicating addresses of non-discharging nozzles 42*a*, which are the nozzles 42*a* not designated to discharge the ink therefrom. The communication I/Fs 41, 41*d* are connected to the forward-communication path 51 and the backward-communication path 52.

The correcting circuit 41*e* in the SoC(k) may receive the print data on a line basis from a device upstream, which includes the main controlling circuit 7*a* and another one of the SoCs 41 connected upstream therefrom. The correcting circuit 41*e* receiving the print data from upstream may delete print data corresponding to the addresses of the non-discharging nozzles 42*a* from the received print data, in other words, correct the print data, and transmit the corrected print data to the compressing circuit 41*f* in the SoC(k). The compressing circuit 41*f* receiving the print data from the correcting circuit 41*e* may compress the received print data and transmit the compressed print data to the storage 41*b* in the SoC(k). The storage 41*b* receiving the print data may store the received print data therein. A compression rate of the compressing circuit 41*f* in each head module 40 is not constant; therefore, a volume of the print data stored in the storage 41*b* in each head module 40 is not constant, and the vacancy volume in the storage 41*b* is not constant. A volume of data from upstream to be received by the SoC(k) corresponds to a volume of the print data corrected by the correcting circuit 41*e* and corresponds to a volume of the print data compressed by the compressing circuit 41*f*.

The storage 41*b* may transmit the compressed print data to the decompressing circuit 41*g* in the SoC(k). The decompressing circuit 41*g* may decompress the print data received from the storage 41*b* and transmit the decompressed print data to the head (k). Based on the print data received from the decompressing circuit 41*g*, the head (k) may operate and discharge the ink through the nozzles 42*a*.

The storage 41*b* may transmit information indicating a vacancy volume A thereof to the data-requesting circuit 41*h*. Based on the information including the vacancy volume A, the data-requesting circuit 41*h* may transmit a request for next print data, i.e., a unit of print data for a next line, to the coordinating circuit 41*j*. The coordinating circuit 41*j* may receive the request for the print data, i.e., request for print data to be provided to the SoC(k) of its own, from the data-requesting circuit 41*h*. The coordinating circuit 41*j* may receive the request for print data from the SoC 41 downstream, i.e., request for print data from the SoC(k+1) through SoC (n). The coordinating circuit 41*j* may coordinate priority between the request for the print data for the SoC(k) of its own and the request for the print data received from the SoC 41 downstream and transmit either one of the requests upstream.

Figure 5:
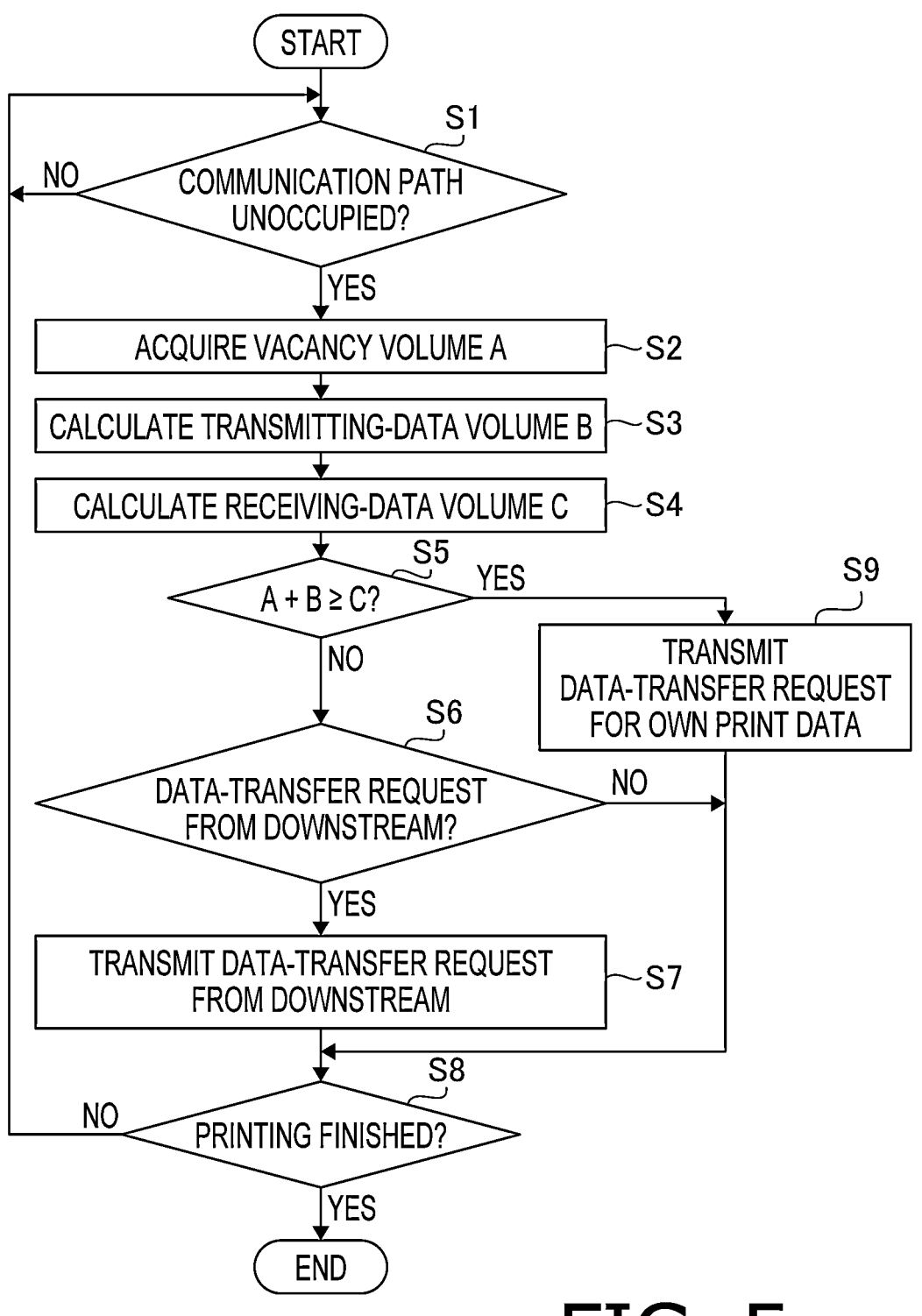
FIG. 5 is a flowchart to illustrate an example of a data-transfer process to be executed in an SoC(k).

FIG. 5 is a flowchart to illustrate an example of a data-transfer process to be executed in the SoC(k). The data-transfer process may be executed in the following steps while the printing apparatus 1 prints an image. The coordinating circuit 41*j* in the SoC(k) determines whether the forward-communication path 51 is unoccupied (S1). In this context, the condition of the forward-communication path 51 being unoccupied may not necessarily mean that the forward-communication path 51 is completely free to use but may include a condition that the forward-communication path 51 is partly used for data transmission and another part of the forward-communication path 51 is usable. When the forward-communication path 51 is unoccupied, and in response to a request for print data from the coordinating circuit 41*j*, the main controlling circuit 7*a* may transmit the print data as requested to the SoC(k) through the forward-communication path 51. If the coordinating circuit 41*j* determines that the forward-communication path 51 is occupied (S1: NO), the process repeats S1.

If the coordinating circuit 41*j* determines that the forward-communication path 51 is unoccupied (S1: YES), the coordinating circuit 41*j* acquires the vacancy volume A in the storage 41*b* of the SoC(k) (S2). The coordinating circuit 41*j* calculates a transmitting-data volume B, which is a volume of outgoing data to be transmitted to the head (k) within a specific period D (S3). The coordinating circuit 41*j* calculates a receiving-data volume C, which is a volume of incoming data to be received from upstream, i.e., from the SoC(k−1), within the specific period D (S4).

The coordinating circuit 41*j* determines whether a sum of the vacancy volume A and the transmitting-data volume B is greater than or equal to the receiving-data volume C (S5). If the coordinating circuit 41*j* determines that the sum of the vacancy volume A and the transmitting-data volume B is greater than or equal to the receiving-data volume C (S5: YES), the coordinating circuit 41*j* transmits a request for the print data to be transferred from the SoC(k−1) to the correcting circuit of the SoC(k) of its own upstream to the SoC(k−1) (S9) and determines whether printing of the image is finished (S8).

In the following context, the request for print data to be transferred will be called a data-transfer request. The data-transfer request includes a data-transfer request from the SoC(k) for the print data to its own correcting circuit 41*e*, in other words, to itself, and a data-transfer request from the SoC 41 downstream for the print data to the correcting circuit 41*e* of the downstream SoC 41. If the coordinating circuit 41*j* determines that printing of the image is not finished (S8: NO), the coordinating circuit 41*j* returns to S1. If the coordinating circuit 41*j* determines that printing of the image is finished (S8: YES), the coordinating circuit 41*j* ends the process.

If the coordinating circuit 41*j* determines that the sum of the vacancy volume A and the transmitting-data volume B is neither greater than nor equal to the receiving-data volume C (S5: NO), in other words, if the sum of the vacancy volume A and the transmitting-data volume B is smaller than the receiving-data volume C, the coordinating circuit 41*j* determines whether a data-transfer request for print data from downstream, i.e., from the SoC(k+1), is received (S6). If the coordinating circuit 41*j* determines that no data-transfer request from downstream is received (S6: NO), the coordinating circuit 41*j* proceeds to S8.

If the coordinating circuit 41*j* determines that a data-transfer request from downstream is received (S6: YES), the coordinating circuit 41J transmits the data-transfer request received from downstream to upstream, i.e., to the SoC(k−1) (S7) and proceeds to S8.

Second Embodiment

Figure 6:
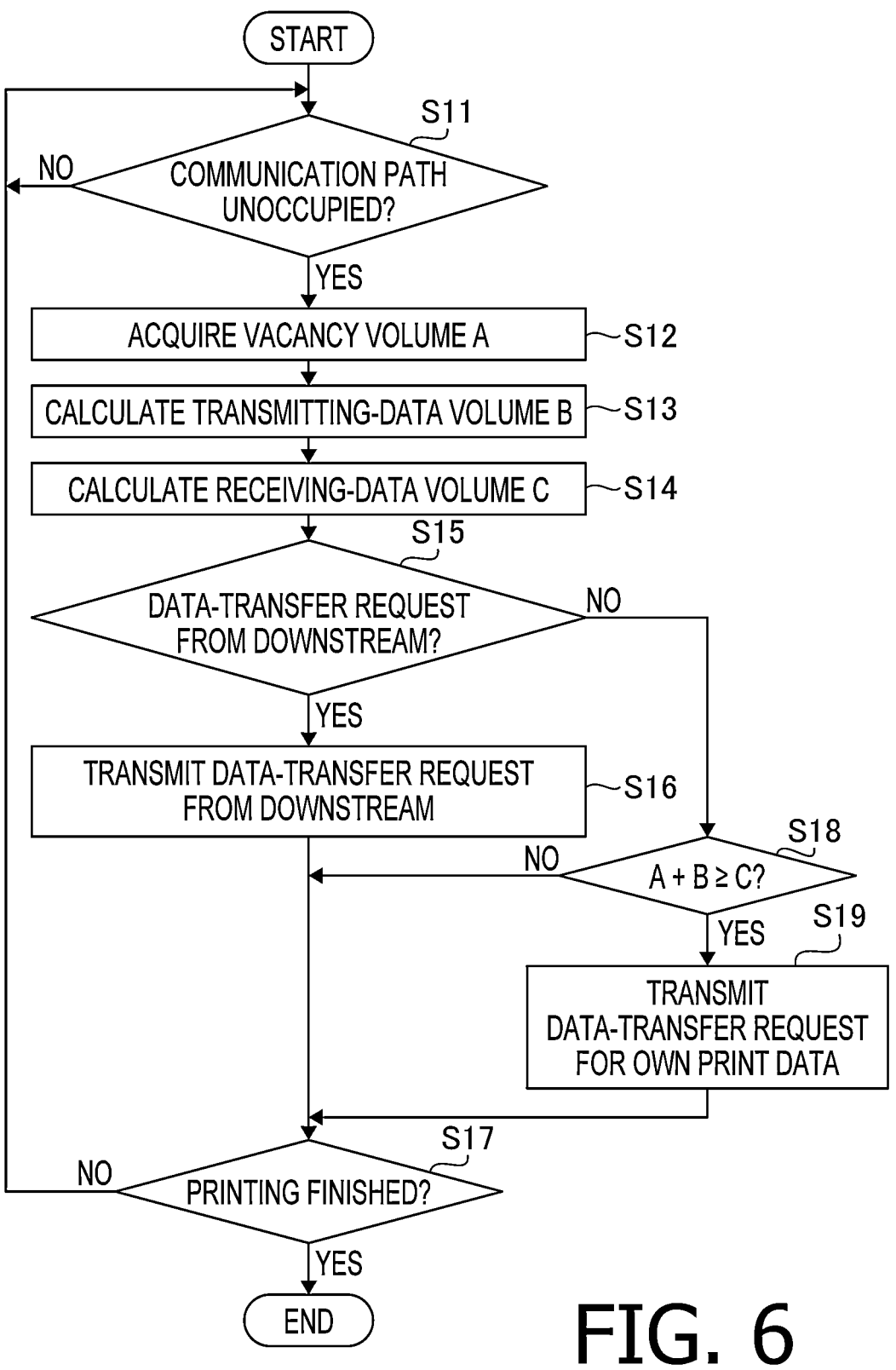
FIG. 6 is a flowchart to illustrate another example of the data-transfer process to be executed in the SoC(k).

A second embodiment of the present disclosure will be described below with reference to FIG. 6. Items in the second embodiment that are equal or substantially similar to those described in the first embodiment will be referred to by the same reference sings, and detailed description of those will be herein omitted. FIG. 6 is a flowchart to illustrate another example of the data-transfer process to be executed in the SoC(k). The data-transfer process may be executed in the following steps while the printing apparatus 1 prints an image.

The coordinating circuit 41*j* in the SoC(k) determines whether the forward-communication path 51 is unoccupied (S11).

When the forward-communication path 51 is unoccupied, and in response to a request for print data from the coordinating circuit 41*j*, the main controlling circuit 7*a* may transmit the print data as requested to the SoC(k) through the forward-communication path 51. If the coordinating circuit 41*j* determines that the forward-communication path 51 is occupied (S11: NO), the process repeats S11.

If the coordinating circuit 41*j* determines that the forward-communication path 51 is unoccupied (S11: YES), the coordinating circuit 41*j* acquires a vacancy volume A in the storage 41*b* in the SoC(k) (S12). The coordinating circuit 41*j* calculates a transmitting-data volume B, which is a volume of outgoing data to be transmitted to the head (k) within a specific period D (S13). The coordinating circuit 41*j* calculates a receiving-data volume C, which is a volume of incoming data to be received from upstream within the specific period D, from the SoC(k−1) (S14).

The coordinating circuit 41*j* determines whether a data-transfer request for print data from downstream, i.e., from the SoC(k+1), is received (S15). If the coordinating circuit 41*j* determines that a data-transfer request from downstream is received (S15: YES), the coordinating circuit 41J transmits the data-transfer request received from downstream to upstream, i.e., to the SoC(k−1) (S16) and determines whether printing of the image is finished (S17). If the coordinating circuit 41*j* determines that printing of the image is not finished (S17: NO), the coordinating circuit 41*j* returns to S11. If the coordinating circuit 41*j* determines that printing of the image is finished (S17: YES), the coordinating circuit 41*j* ends the process.

In S15, if the coordinating circuit 41*j* determines that no data-transfer request from downstream is received (S15: NO), the coordinating circuit 41*j* determines whether a sum of the vacancy volume A and the transmitting-data volume B is greater than or equal to the receiving-data volume C (S18). If the coordinating circuit 41*j* determines that the sum of the vacancy volume A and the transmitting-data volume B is greater than or equal to the receiving-data volume C (S18: YES), the coordinating circuit 41*j* transmits a data-transfer request upstream, i.e., to the SoC(k−1), for the print data to be transferred from the SoC(k−1) to the correcting circuit 41*e* of the SoC(k) of its own (S19) and proceeds to S17. The data-transfer request from the SoC(k) in S19 is the request for the print data to its own correcting circuit 41*e*. If the coordinating circuit 41*j* determines that the sum of the vacancy volume A and the transmitting-data volume B is neither greater than nor equal to the receiving-data volume C (S18: NO), in other words, if the sum of the vacancy volume A and the transmitting-data volume B is smaller than the receiving-data volume C, the coordinating circuit 41*j* proceeds to S17.

According to the printing apparatus 1 in the second embodiment, the coordinating circuit 41*j* in the SoC(k) may transmit the data-transfer request from downstream to upstream when the data-transfer request from downstream is received regardless of whether the sum of the vacancy volume A and the transmitting-data volume B is greater than or equal to the receiving-data volume C. In other words, the coordinating circuit 41*j* may transmit the data-transfer request from downstream with priority over the data-transfer request for the print data to its own correcting circuit 41*e*.

Third Embodiment

A third embodiment of the present disclosure will be described below with reference to FIG. 7. Items in the third embodiment that are equal or substantially similar to those described in the first and/or second embodiments will be referred to by the same reference sings, and detailed description of those will be herein omitted. In the third embodiment, when a data-transfer request is transmitted from a downstream one of the SoCs 41 to an upstream one of the SoCs 41, the downstream one of the SoCs 41 may append information of a vacancy volume in its own storage 41*b* to the data-transfer request.

Figure 7:
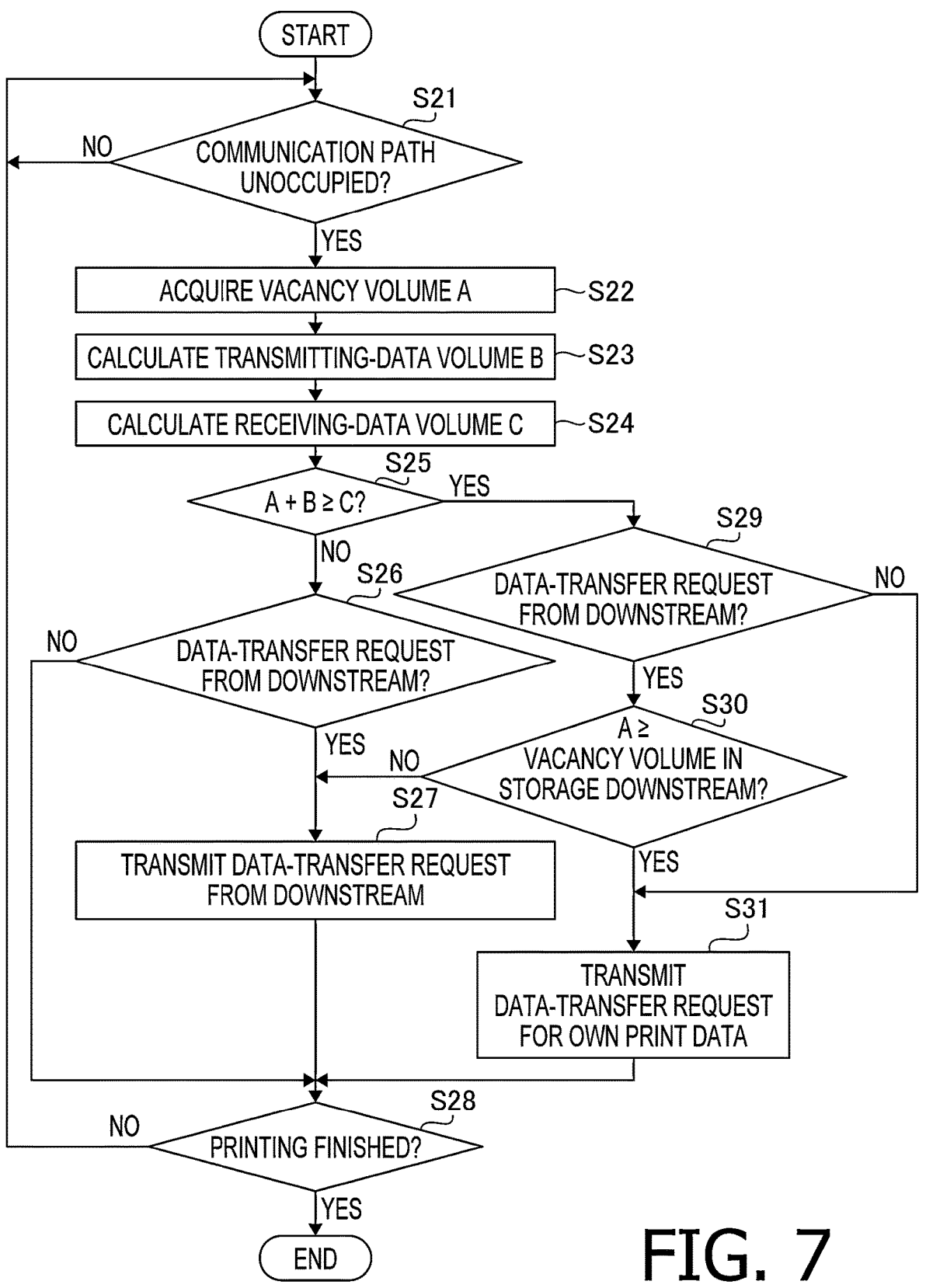
FIG. 7 is a flowchart to illustrate another example of the data-transfer process to be executed in the SoC(k).

FIG. 7 is a flowchart to illustrate another example of the data-transfer process to be executed in the SoC(k). The data-transfer process may be executed in the following steps while the printing apparatus 1 prints an image.

The coordinating circuit 41*j* in the SoC(k) determines whether the forward-communication path 51 is unoccupied (S21). When the forward-communication path 51 is unoccupied, and in response to a request for print data from the coordinating circuit 41*j*, the main controlling circuit 7*a* may transmit the print data as requested to the SoC(k) through the forward-communication path 51. If the coordinating circuit 41*j* determines that the forward-communication path 51 is occupied (S21: NO), the process returns to S21.

If the coordinating circuit 41*j* determines that the forward-communication path 51 is unoccupied (S21: YES), the coordinating circuit 41*j* acquires a vacancy volume A in the storage 41*b* in the SoC(k) (S22). The coordinating circuit 41*j* calculates a transmitting-data volume B, which is a volume of outgoing data to be transmitted to the head (k) within a specific period D (S23). The coordinating circuit 41*j* calculates a receiving-data volume C, which is a volume of incoming data to be received from upstream, i.e., from the SoC(k−1), within the specific period D (S24).

The coordinating circuit 41*j* determines whether a sum of the vacancy volume A and the transmitting-data volume B is greater than or equal to the receiving-data volume C (S25). If the coordinating circuit 41*j* determines that the sum of the vacancy volume A and the transmitting-data volume B is neither greater than nor equal to the receiving-data volume C (S25: NO), in other words, if the sum of the vacancy volume A and the transmitting-data volume B is smaller than the receiving-data volume C, the coordinating circuit 41*j* determines whether a data-transfer request for print data from downstream, i.e., from the SoC(k+1), is received (S26). If the coordinating circuit 41*j* determines that a data-transfer request from downstream is received (S26: YES), the coordinating circuit 41J transmits the data-transfer request received from downstream to upstream, i.e., to the SoC(k−1) (S27) and determines whether printing of the image is finished (S28). If the coordinating circuit 41*j* determines that printing of the image is not finished (S28: NO), the coordinating circuit 41*j* returns to S21. If the coordinating circuit 41*j* determines that printing of the image is finished (S28: YES), the coordinating circuit 41*j* ends the process.

In S26, if the coordinating circuit 41*j* determines that no transfer request for print data from downstream is received (S26: NO), the coordinating circuit 41*j* proceeds to S28.

In S25, if the coordinating circuit 41*j* determines that the sum of the vacancy volume A and the transmitting-data volume B is greater than or equal to the receiving-data volume C (S25: YES), the coordinating circuit 41*j* determines whether a data-transfer request for print data from downstream, i.e., from the SoC(k+1), is received (S29). If the coordinating circuit 41*j* determines that a data-transfer request from downstream is received (S29: YES), the coordinating circuit 41*j* determines whether the vacancy volume A is greater than or equal to the vacancy volume appended to the data-transfer request received from the downstream SoC 41, i.e., the vacancy volume in the storage 41*b* of the downstream SoC 41 (S30).

If the coordinating circuit 41*j* determines that the vacancy volume A is greater than or equal to the vacancy volume in the storage 41*b* of the downstream SoC 41 (S30: YES), the coordinating circuit 41*j* transmits a data-transfer request upstream, i.e., to the SoC(k−1), for the print data to be transferred from the SoC(k−1) to the correcting circuit 41*e* of the SoC(k) of its own (S31) and proceeds to S28. In S30, if the coordinating circuit 41*j* determines that the vacancy volume A is neither greater than nor equal to the vacancy volume in the storage 41*b* of the downstream SoC 41 (S30: NO), in other words, if the vacancy volume A is smaller than the vacancy volume in the storage 41*b* of the downstream SoC 41, the coordinating circuit 41*j* proceeds to S27, in which the coordinating circuit 41*j* transmits the data-transfer request from downstream to upstream, i.e., to the SoC(k−1) (S27).

Fourth Embodiment

A fourth embodiment of the present disclosure will be described below with reference to FIG. 8. Items in the fourth embodiment that are equal or substantially similar to those described in the first, second, and/or third embodiments will be referred to by the same reference sings, and detailed description of those will be herein omitted. In the fourth embodiment, when a data-transfer request is transmitted from a downstream one of the SoCs 41 to an upstream one of the SoCs 41, the downstream one of the SoCs 41 may append information of a vacancy volume in its own storage 41*b* and an identifier thereof to the data-transfer request.

Figure 8:
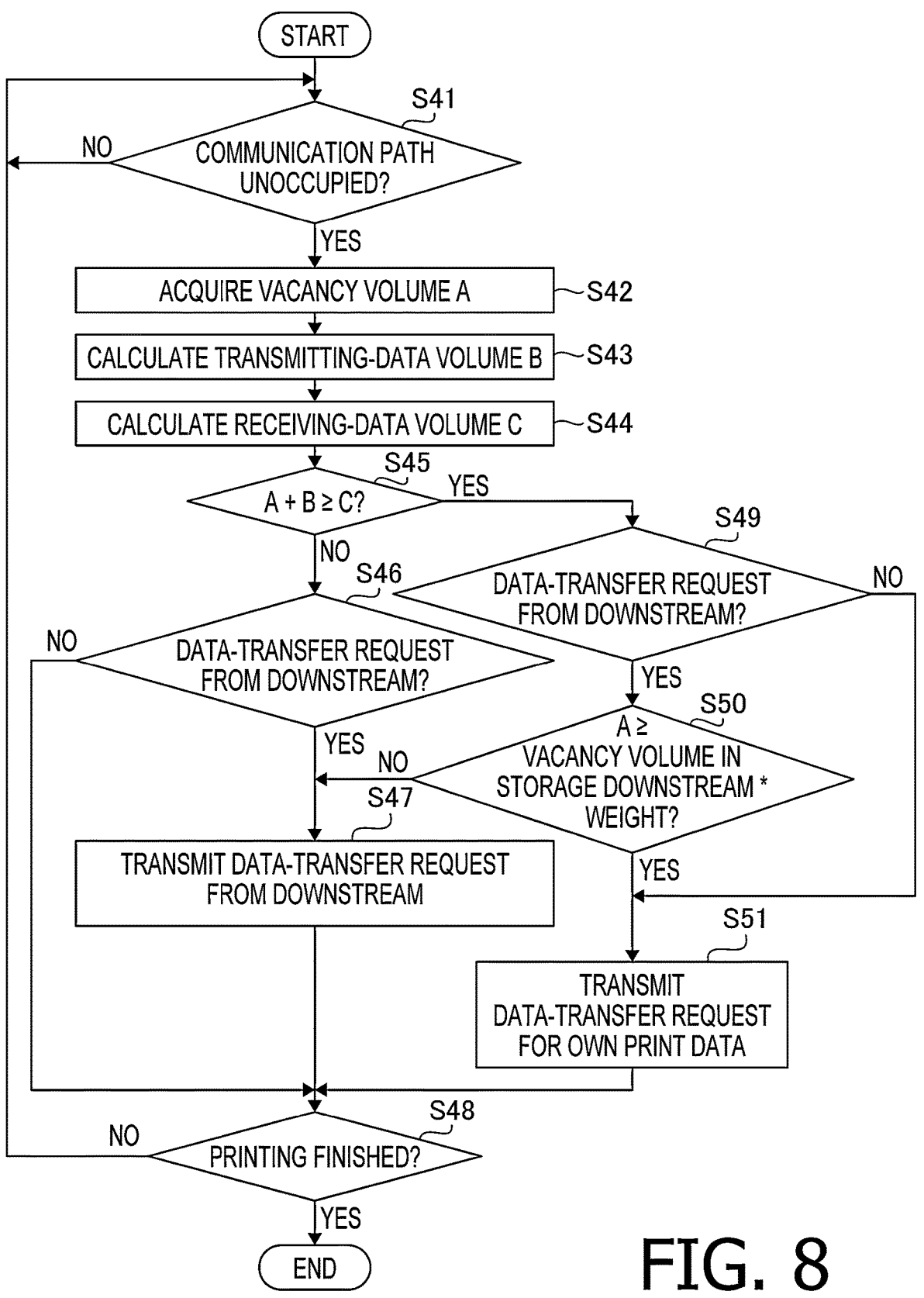
FIG. 8 is a flowchart to illustrate another example of the data-transfer process to be executed in the SoC(k).

FIG. 8 is a flowchart to illustrate another example of the data-transfer process to be executed in the SoC(k). Steps S41-S49 and S51 are substantially equal to S21-S29 and S31 in FIG. 7; therefore, detailed description of those are herein omitted. In the following paragraphs, S50 will be mainly described in detail.

The coordinating circuit 41*j* determines whether a sum of the vacancy volume A and the transmitting-data volume B is greater than or equal to the receiving-data volume C (S45). If the coordinating circuit 41*j* determines that the sum of the vacancy volume A and the transmitting-data volume B is greater than or equal to the receiving-data volume C (S45: YES), the coordinating circuit 41*j* proceeds to S49.

In S49, if the coordinating circuit 41*j* determines that a data-transfer request from downstream is received (S49: YES), the coordinating circuit 41*j* determines whether the vacancy volume A is greater than or equal to a vacancy volume, i.e., a vacancy volume in the storage 41*b* of the downstream SoC 41 multiplied by a weight coefficient, appended to the data-transfer request received from the downstream SoC 41 (S50). The weight coefficient may be determined, for example, in a method described below.

The coordinating circuit 41*j* of the SoC(k) may refer to the identifier appended to the data-transfer request received from downstream and calculate a weight coefficient according to a distance between the downstream SoC 41 that transmitted the data-transfer request and the SoC(k) of its own. As the distance between the downstream SoC 41 and the SoC(k) of its own increases, a time period between the time when the downstream SoC 41 transmits the data-transfer request and the time when the SoC(k) receives the data-transfer request tends to increase, and accordingly, a volume of the outgoing data to be transmitted from the downstream SoC 41 to the head 42 tends to increase, and a vacancy volume in the downstream SoC 41 tends to increase. In other words, at the time when the coordinating circuit 41J of the SoC(k) receives the vacancy volume from the downstream SoC 41, the received vacancy volume in the downstream SoC may be smaller than the actual volume of vacancy in the downstream SoC 41.

Therefore, the coordinating circuit 41*j* of the SoC(k) calculates the weight coefficient based on the distance between the downstream SoC 41 that transmitted the data-transfer request and the SoC(k) of its own. For example, when the coordinating circuit 41*j* receives the data-transfer request from the SoC(k+1), the coordinating circuit 41*j* may multiply a basic coefficient by G1 for the weight coefficient; when the coordinating circuit 41*j* receives the data-transfer request from the SoC(k+2), the coordinating circuit 41*j* may multiply the basic coefficient by G2 for the weight coefficient; and when the coordinating circuit 41*j* receives the data-transfer request from the SoC(k+3), the coordinating circuit 41*j* may multiply the basic coefficient by G1 for the weight coefficient. The basic coefficient and the multiplying values G1, G2, and G3 are positive values, G1 is smaller than G2, and G2 is smaller than G3 (G1<G2<G3).

If the coordinating circuit 41*j* determines that the vacancy volume A is greater than or equal to the vacancy volume in the storage 41*b* of the downstream SoC 41 multiplied by the weight coefficient (S50: YES), the coordinating circuit 41*j* transmits a data-transfer request upstream, i.e., to the SoC (k−1), for the print data to be transferred from the SoC(k−1) to the correcting circuit 41*e* of the SoC(k) of its own (S51).

If the coordinating circuit 41*j* determines that the vacancy volume A is neither greater than nor equal to the vacancy volume in the storage 41*b* of the downstream SoC 41 multiplied by the weight coefficient (S50: NO), the coordinating circuit 41J transmits the data-transfer request received from downstream to upstream, i.e., to the SoC(k−1) (S47). In S50, when the distance from the downstream SoC 41 that transmitted the data-transfer request and the SoC(k) of its own is longer, the coordinating circuit 41*j* is more likely to determine that the vacancy volume A is smaller than the vacancy volume in the storage 41*b* of the downstream SoC 41 multiplied by the weight coefficient. In other words, the data-transfer request from the downstream SoC 41 may be prioritized over the data-transfer request from the SoC(k) of its own. In S49, if the coordinating circuit 41*j* determines that no data-transfer request from downstream is received (S49: NO), the coordinating circuit 41*j* proceeds to S51.

Fifth Embodiment

A fifth embodiment of the present disclosure will be described below with reference to FIG. 9. Items in the fifth embodiment that are equal or substantially similar to those described in the first, second, third, and/or fourth embodiments will be referred to by the same reference sings, and detailed description of those will be herein omitted. In the fifth embodiment, when a data-transfer request is transmitted from a downstream one of the SoCs 41 to an upstream one of the SoCs 41, the downstream one of the SoCs 41 may append information of a vacancy volume in its own storage 41*b*, time when the vacancy volume is measured, and an identifier thereof to the data-transfer request.

Figure 9:
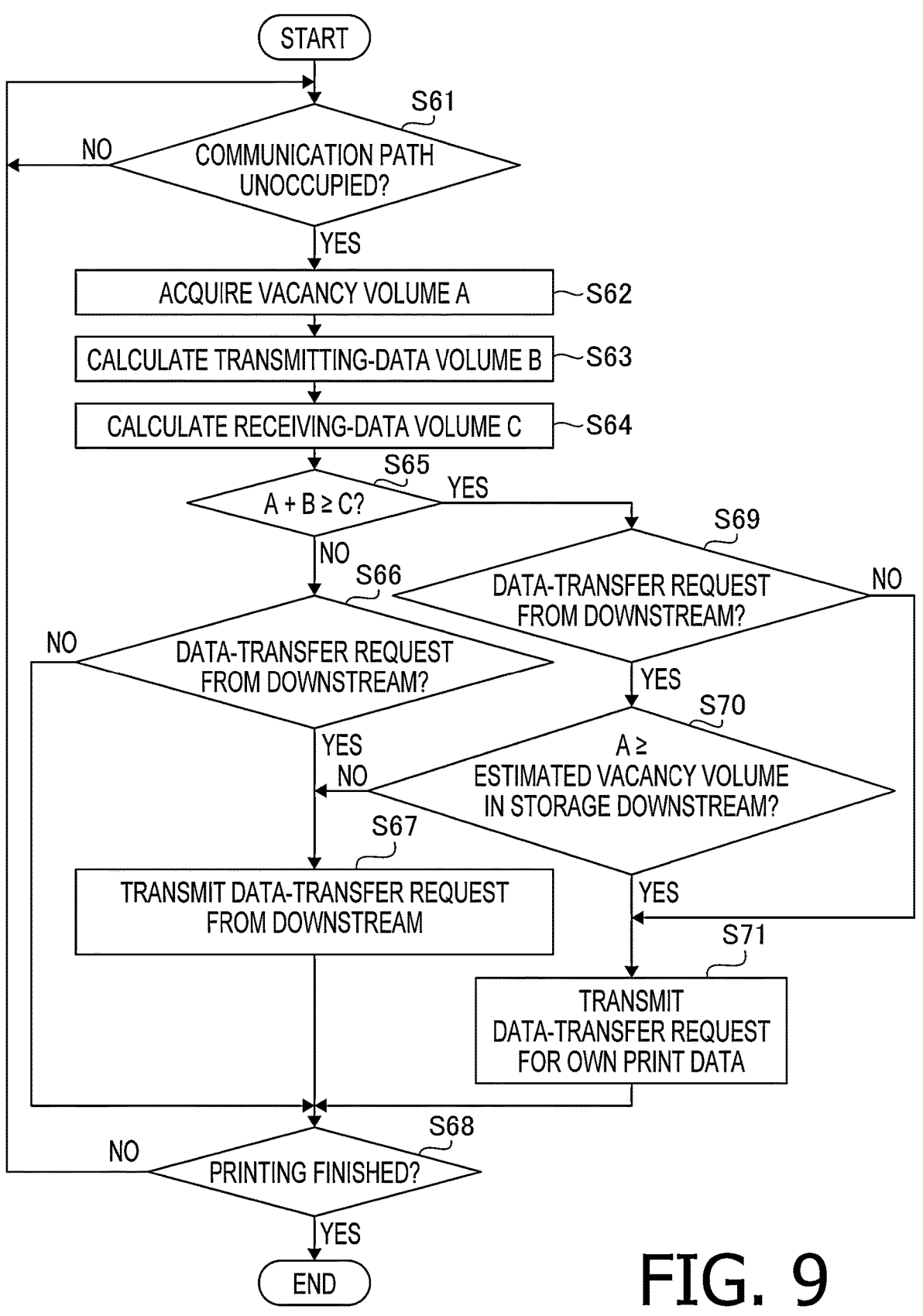
FIG. 9 is a flowchart to illustrate another example of the data-transfer process to be executed in the SoC(k).

FIG. 9 is a flowchart to illustrate another example of the data-transfer process to be executed in the SoC(k). Steps S61-S69 and S71 in FIG. 9 are substantially equal to S21-S29 and S31 in FIG. 7; therefore, detailed description of those are herein omitted. In the following paragraphs, S70 will be mainly described in detail.

The coordinating circuit 41*j* determines whether a sum of the vacancy volume A and the transmitting-data volume B is greater than or equal to the receiving-data volume C (S65). If the coordinating circuit 41*j* determines that the sum of the vacancy volume A and the transmitting-data volume B is greater than or equal to the receiving-data volume C (S65: YES), the coordinating circuit 41*j* proceeds to S69.

In S69, if the coordinating circuit 41*j* determines that a data-transfer request from downstream is received (S69: YES), the coordinating circuit 41*j* determines whether vacancy volume A is greater than or equal to an estimated vacancy volume in the storage 41*b* of the downstream SoC 41 (S70). The estimated vacancy volume may be determined, for example, in a method described below.

The coordinating circuit 41*j* of the SoC(k) may acquire a first clock time, which is appended to the data-transfer request from the downstream SoC 41. The coordinating circuit 41*j* of the SoC(k) may acquire a second clock time, which indicates a clock time when the data-transfer request from downstream is received. The coordinating circuit 41*j* of the SoC(k) calculates a time period between the first clock time and the second clock time and multiply the time period by a speed, at which the downstream SoC 41 transmits the print data to the head 42. The product of the multiplication indicates a vacancy volume that may increase in the storage 41*b* of the downstream SoC 41 from the time when the data-transfer request is transmitted from the downstream SoC 41 until the data-transfer request is received in the SoC(k). In other words, a sum of the vacancy volume added to the data-transfer request from the downstream SoC 41 and the product of the multiplication is the estimated vacancy volume in the storage 41*b* of the downstream SoC 41.

If the coordinating circuit 41*j* determines that the vacancy volume A is greater than or equal to the estimated vacancy volume in the storage 41*b* of the downstream SoC 41 (S70: YES), the coordinating circuit 41*j* transmits a data-transfer request upstream, i.e., to the SoC(k−1), for the print data to be transferred from the SoC(k−1) to the correcting circuit 41*e* of the SoC(k) of its own (S71). In S69, if the coordinating circuit 41*j* determines that no data-transfer request from downstream is received (S69: NO), the coordinating circuit 41*j* proceeds to S71.

If the coordinating circuit 41*j* determines that the vacancy volume A is neither greater than nor equal to the estimated vacancy volume in the storage 41*b* of the downstream SoC 41 (S70: NO), the coordinating circuit 41J transmits the data-transfer request received from downstream to upstream, i.e., to the SoC(k−1) (S67). In S70, when the distance between the downstream SoC 41 that transmitted the data-transfer request and the SoC(k) of its own is longer, the coordinating circuit 41*j* is more likely to determine that the vacancy volume A is smaller than the estimated vacancy volume in the storage 41*b* of the downstream SoC 41. In other words, the data-transfer request from the downstream SoC 41 may be prioritized over the own data-transfer request from the SoC(k). According to the fifth embodiment, compared to the fourth embodiment, in which the weight coefficient is applied, the vacancy volume in the storage 41*b* of the downstream Soc may be estimated more accurately.

In any of the embodiments according to the present disclosure, the computer programs may optionally be deployed to run on a single computer or on a single site, or may be distributed to a plurality of sites to be sun on a plurality of computers that are mutually connected through a communication network.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:
1. A printing apparatus, comprising:
a main controlling circuit;
a subsidiary controlling circuit group including a plurality of subsidiary controlling circuits connected with one another serially, the subsidiary controlling circuit group being configured to transmit print data received from the main controlling circuit from upstream to downstream through the plurality of subsidiary controlling circuits, the plurality of subsidiary controlling circuits including a first subsidiary controlling circuit and a second subsidiary controlling circuit on an upstream side of the first subsidiary controlling circuit; and
a plurality of heads,
wherein the first subsidiary controlling circuit is configured to:
based on a volume of outgoing data to be transmitted from the first subsidiary controlling circuit to one of the plurality of heads corresponding to the first subsidiary controlling circuit and a volume of incoming data from the second subsidiary controlling circuit to be received by the first subsidiary controlling circuit, determine whether a first data-transfer request is to be transmitted from the first subsidiary controlling circuit to the second subsidiary controlling circuit, the first data-transfer request being a request for the print data to be transferred from upstream to the first subsidiary controlling circuit; and
based on a determination that the first data-transfer request is to be transmitted, transmit the first data-transfer request to the second subsidiary controlling circuit.
2. The printing apparatus according to claim 1, wherein the plurality of subsidiary controlling circuits includes a third subsidiary controlling circuit on a downstream side of the first subsidiary controlling circuit;
the first subsidiary controlling circuit is configured to:
determine whether the first subsidiary controlling circuit receives a second data-transfer request from the third subsidiary controlling circuit, the second data-transfer request being a request for the print data to be transferred from upstream to the third subsidiary controlling circuit;
in a case where the first subsidiary controlling circuit receives the second data-transfer request from the third subsidiary controlling circuit, transmit the second data-transfer request received from the third subsidiary controlling circuit to the second subsidiary controlling circuit; and
in a case where the first subsidiary controlling circuit does not receive the second data-transfer request from the third subsidiary controlling circuit, transmit the first data-transfer request to the second subsidiary controlling circuit.
3. The printing apparatus according to claim 1, wherein the plurality of subsidiary controlling circuits includes a third subsidiary controlling circuit on a downstream side of the first subsidiary controlling circuit;
each of the plurality of subsidiary controlling circuits includes a storage; and
the first subsidiary controlling circuit is configured to:
based on the determination that the first data-transfer request is to be transmitted, and in a case where the first subsidiary controlling circuit receives a second data-transfer request from the third subsidiary controlling circuit, the second data-transfer request being a request for the print data to be transferred from upstream to the third subsidiary controlling circuit, determine whether a vacancy volume in the storage of the first subsidiary controlling circuit is greater than or equal to a vacancy volume in the storage of the third subsidiary controlling circuit;
in a case where the first subsidiary controlling circuit determines that the vacancy volume in the storage of the first subsidiary controlling circuit is greater than or equal to the vacancy volume in the storage of the third subsidiary controlling circuit, transmit the first data-transfer request to the second subsidiary controlling circuit; and in a case where the first subsidiary controlling circuit determines that the vacancy volume in the storage of the first subsidiary controlling circuit is neither greater than nor equal to the vacancy volume in the storage of the third subsidiary controlling circuit, transmit the second data-transfer request received from the third subsidiary controlling circuit to the second subsidiary controlling circuit.

4. The printing apparatus according to claim 1, wherein the plurality of subsidiary controlling circuits includes a third subsidiary controlling circuit on a downstream side of the first subsidiary controlling circuit;

each of the plurality of subsidiary controlling circuits includes a storage;

the first subsidiary controlling circuit is configured to, based on the determination that the first data-transfer request is to be transmitted, and in a case where the first subsidiary controlling circuit receives a second data-transfer request from the third subsidiary controlling circuit, the second data-transfer request being a request for the print data to be transferred from upstream to the third subsidiary controlling circuit, determine whether a vacancy volume in the storage of the first subsidiary controlling circuit is greater than or equal to a value;

the value corresponds to a vacancy volume in the storage of the third subsidiary controlling circuit multiplied by a weight coefficient corresponding to a distance between the first subsidiary controlling circuit and the third subsidiary controlling circuit; and the first subsidiary controlling circuit is further configured to:

in a case where the first subsidiary controlling circuit determines that the vacancy volume in the storage of the first subsidiary controlling circuit is greater than or equal to the value, transmit the first data-transfer request upstream to the second subsidiary controlling circuit; and in a case where the first subsidiary controlling circuit determines that the vacancy volume in the storage of the first subsidiary controlling circuit is neither greater than nor equal to the value, transmit the second data-transfer request received from the third subsidiary controlling circuit to the second subsidiary controlling circuit.

5. The printing apparatus according to claim 1, wherein the plurality of subsidiary controlling circuits includes a third subsidiary controlling circuit on a downstream side of the first subsidiary controlling circuit;

each of the plurality of subsidiary controlling circuits includes a storage;

the first subsidiary controlling circuit is configured to, based on the determination that the first data-transfer request is to be transmitted, and in a case where the first subsidiary controlling circuit receives a second data-transfer request from the third subsidiary controlling circuit, the second data-transfer request being a request for the print data to be transferred from upstream to the third subsidiary controlling circuit, determine whether a vacancy volume in the storage of the first subsidiary controlling circuit is greater than or equal to an estimated vacancy volume in the storage of the third subsidiary controlling circuit;

the estimated vacancy volume is based on a vacancy volume in the storage of the third subsidiary controlling circuit and corresponds to a distance between the first subsidiary controlling circuit and the third subsidiary controlling circuit and to a clock time when the third subsidiary controlling circuit measured the vacancy volume in the storage of the third subsidiary controlling circuit; and the first subsidiary controlling circuit is further configured to:

in a case where the first subsidiary controlling circuit determines that the vacancy volume in the storage of the first subsidiary controlling circuit is greater than or equal to the estimated vacancy volume in the storage of the third subsidiary controlling circuit, transmit the first data-transfer request to the second subsidiary controlling circuit; and in a case where the first subsidiary controlling circuit determines that the vacancy volume in the storage of the first subsidiary controlling circuit is neither greater than nor equal to the estimated vacancy volume in the storage of the third subsidiary controlling circuit, transmit the second data-transfer request received from the third subsidiary controlling circuit to the second subsidiary controlling circuit.

6. The printing apparatus according to claim 1, wherein the plurality of subsidiary controlling circuits includes a third subsidiary controlling circuit on a downstream side of the first subsidiary controlling circuit; and the first subsidiary controlling circuit includes a coordinating circuit configured to coordinate priority between the first data-transfer request and a second data-transfer request received from the third subsidiary controlling circuit, the second data-transfer request being a request for the print data to be transferred from upstream to the third subsidiary controlling circuit.

7. The printing apparatus according to claim 1, wherein each of the plurality of heads includes a plurality of nozzles;

the first subsidiary controlling circuit includes a correcting circuit configured to correct the print data based on non-discharging information, the non-discharging information indicating non-discharging nozzles among the plurality of nozzles; and the volume of incoming data from the second subsidiary controlling circuit to be received by the first subsidiary controlling circuit corresponds to a volume of the print data corrected by the correcting circuit.

8. The printing apparatus according to claim 1, wherein the first subsidiary controlling circuit includes a compressing circuit configured to compress the print data; and the volume of incoming data from the second subsidiary controlling circuit to be received by the first subsidiary controlling circuit corresponds to a volume of the print data compressed by the compressing circuit.

9. The printing apparatus according to claim 1, further comprising a communication path connecting the main controlling circuit and the subsidiary controlling circuit group serially, the communication path transmitting the print data from upstream to downstream, wherein the first subsidiary controlling circuit is configured to determine whether the communication path is unoccupied; and in a case where the first subsidiary controlling circuit determines that the communication path is unoccupied, determine whether the first data-transfer request is to be transmitted to the second subsidiary controlling circuit.

10. The printing apparatus according to claim 1, wherein the plurality of subsidiary controlling circuits includes a third subsidiary controlling circuit on a downstream side of the first subsidiary controlling circuit; and the first subsidiary controlling circuit is configured to, after determining that the first data-transfer request is not to be transmitted to the second subsidiary controlling circuit, determine whether a second data-transfer request is received from the third subsidiary controlling circuit, the second data-transfer request being a request for the print data to be transferred from upstream to the third subsidiary controlling circuit.

11. The printing apparatus according to claim 1, wherein each of the plurality of subsidiary controlling circuits includes a storage; and the first subsidiary controlling circuit is configured to, for determining whether the first data-transfer request is to be transmitted to the second subsidiary controlling circuit, acquire a vacancy volume in the storage of the first subsidiary controlling circuit;

calculate the volume of outgoing data to be transmitted from the first subsidiary controlling circuit to the one of the plurality of heads corresponding to the first subsidiary controlling circuit within a specific period;

calculate the volume of incoming data from the second subsidiary controlling circuit to be received by the first subsidiary controlling circuit;

determine whether a sum of the vacancy volume and the volume of outgoing data is greater than or equal to the volume of incoming data; and in a case where the first subsidiary controlling circuit determines that the sum of the vacancy volume and the volume of outgoing data is greater than or equal to the volume of incoming data, transmit the first data-transfer request to the second subsidiary controlling circuit.

12. A method to be implemented in a printing apparatus, the printing apparatus comprising a main controlling circuit; a subsidiary controlling circuit group including a plurality of subsidiary controlling circuits connected with one another serially, the subsidiary controlling circuit group being configured to transmit print data received from the main controlling circuit from upstream to downstream through the plurality of subsidiary controlling circuits, the plurality of subsidiary controlling circuits including a first subsidiary controlling circuit and a second subsidiary controlling circuit on an upstream side of the first subsidiary controlling circuit; and a plurality of heads, the method comprising:

based on a volume of outgoing data to be transmitted from the first subsidiary controlling circuit to one of the plurality of heads corresponding to the first subsidiary controlling circuit and a volume of incoming data from the second subsidiary controlling circuit to be received by the first subsidiary controlling circuit, determining whether a first data-transfer request is to be transmitted from the first subsidiary controlling circuit to the second subsidiary controlling circuit, the first data-transfer request being a request for the print data to be transferred from upstream to the first subsidiary controlling circuit; and based on a determination that the first data-transfer request is to be transmitted, transmitting the first data-transfer request from the first subsidiary controlling circuit to the second subsidiary controlling circuit.

13. A non-transitory computer readable storage medium storing computer readable instructions that are executable by a computer in a printing apparatus, the printing apparatus comprising a main controlling circuit; a subsidiary controlling circuit group including a plurality of subsidiary controlling circuits connected with one another serially, the subsidiary controlling circuit group being configured to transmit print data received from the main controlling circuit from upstream to downstream through the plurality of subsidiary controlling circuits, the plurality of subsidiary controlling circuits including a first subsidiary controlling circuit and a second subsidiary controlling circuit on an upstream side of the first subsidiary controlling circuit; and a plurality of heads, the computer readable instructions, when executed by the computer, causing the computer to:

based on a volume of outgoing data to be transmitted from the first subsidiary controlling circuit to one of the plurality of heads and a volume of incoming data from the second subsidiary controlling circuit to be received by the first subsidiary controlling circuit, determine whether a first data-transfer request is to be transmitted from the first subsidiary controlling circuit to the second subsidiary controlling circuit, the first data-transfer request being a request for the print data to be transferred from upstream to the first subsidiary controlling circuit; and based on a determination that the first data-transfer request is to be transmitted, transmit the first data-transfer request from the first subsidiary controlling circuit to the second subsidiary controlling circuit.

* * * * *